United States Patent [19]
Ender et al.

[11] 3,714,766
[45] Feb. 6, 1973

[54] MACHINE FOR COMBINING HAY WINDROWS

[76] Inventors: Herman R. Ender, 29516 S. Bird Rd., Tracy; Neal H. Collins, 40 W. Highway 50, Lathrop, both of Calif.

[22] Filed: March 5, 1970

[21] Appl. No.: 16,857

[52] U.S. Cl. .......................56/364, 56/192, 56/344
[51] Int. Cl. .................................A01d 57/28
[58] Field of Search.........56/364, 341, 343, 192, 344

[56] References Cited

UNITED STATES PATENTS

| | | | |
|---|---|---|---|
| 2,747,354 | 5/1956 | Bloser | 56/192 UX |
| 2,239,027 | 4/1941 | Wottrig | 56/192 X |
| 3,105,341 | 10/1963 | De Murrel Crump | 56/192 |
| 2,994,178 | 8/1961 | Hollyday | 56/364 X |

*Primary Examiner*—Louis G. Mancene
*Assistant Examiner*—J. N. Eskovitz
*Attorney*—Webster and Webster

[57] ABSTRACT

A machine, for combining hay windrows, comprising a low level mobile frame adapted for movement along a field between individual, longitudinally extending, laterally spaced, pre-formed windrows, a pair of driven, laterally spaced, longitudinal conveyors on the frame, and a driven pick-up reel at the front end of each conveyor operative to sweep the corresponding individual pre-formed windrow upwardly and to deposit said windrow on the related conveyor; the conveyors moving such individual windrows in a rearward direction, converging rearwardly, and having their rear ends in relatively closely adjacent relation whereby the individual windrows are discharged from the rear ends of the conveyors onto the ground in a composite, longitudinally extending, double-size, central windrow. Additionally, the conveyors are provided at their rear ends with deflectors which cause an inversion of the individual windrows as the latter discharge from the conveyors to form said composite central windrow.

2 Claims, 10 Drawing Figures

INVENTORS
Herman R. Ender
Neal H. Collins

By Webster & Webster
ATTORNEYS

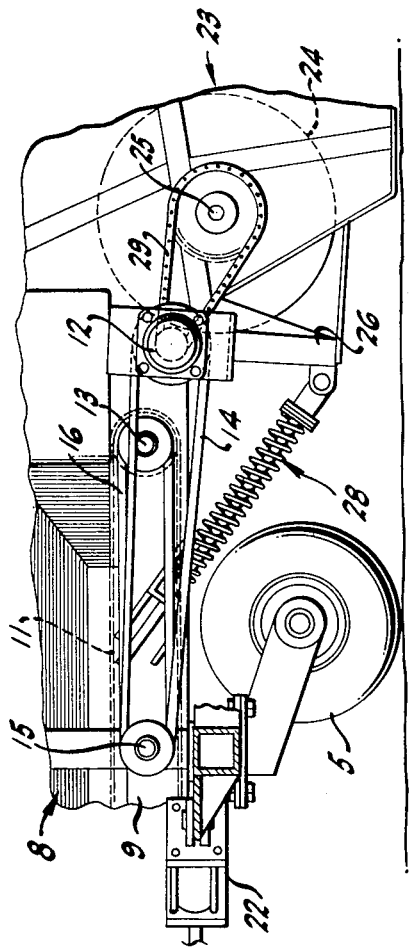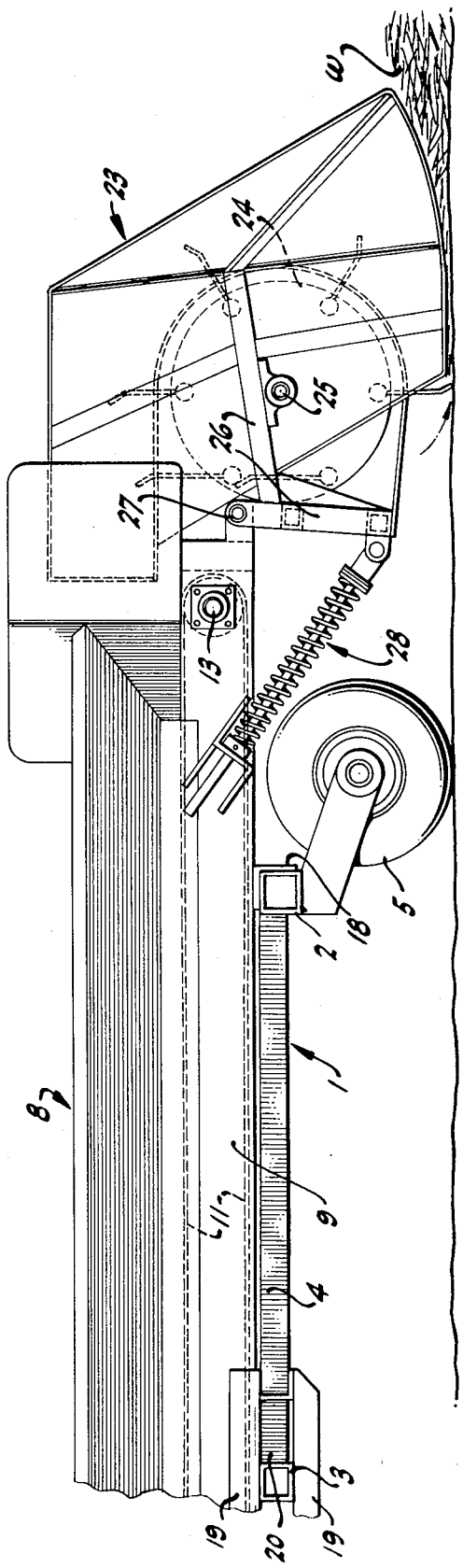

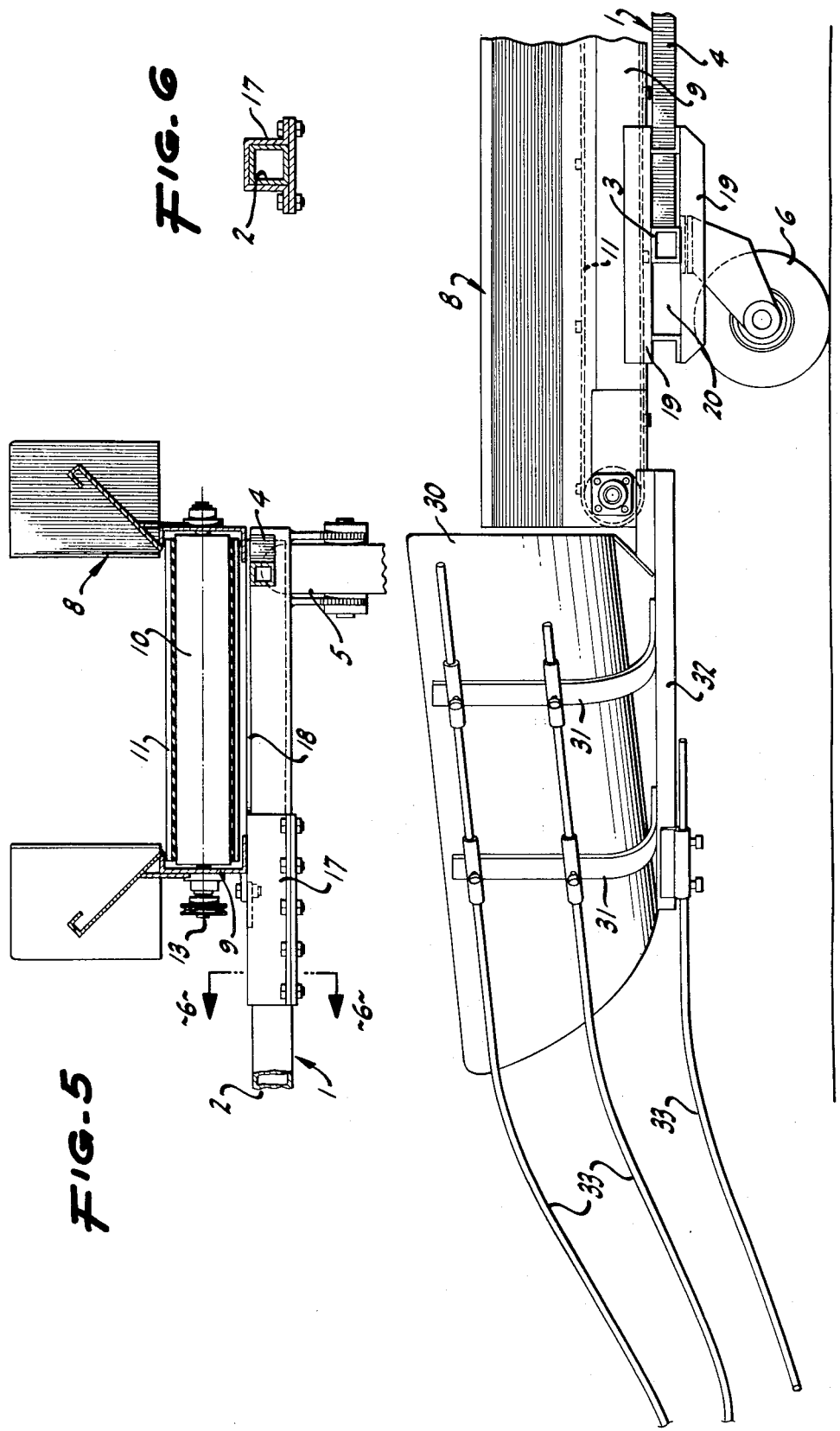

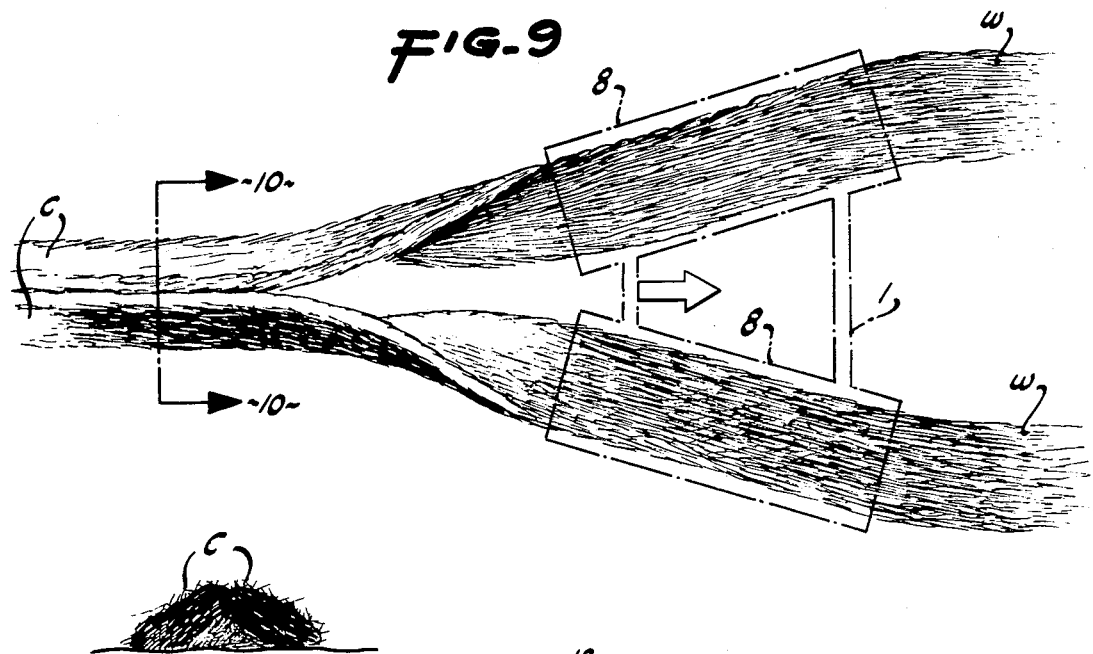
FIG.9
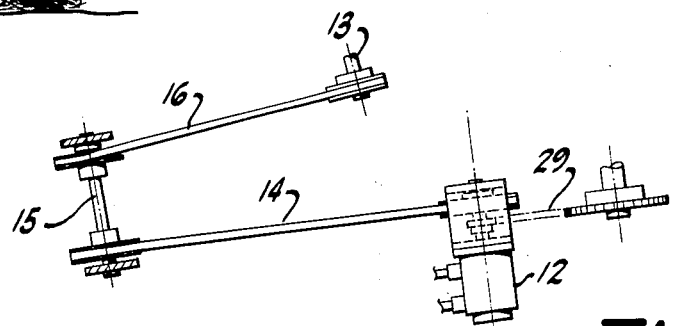
FIG.10
FIG.8
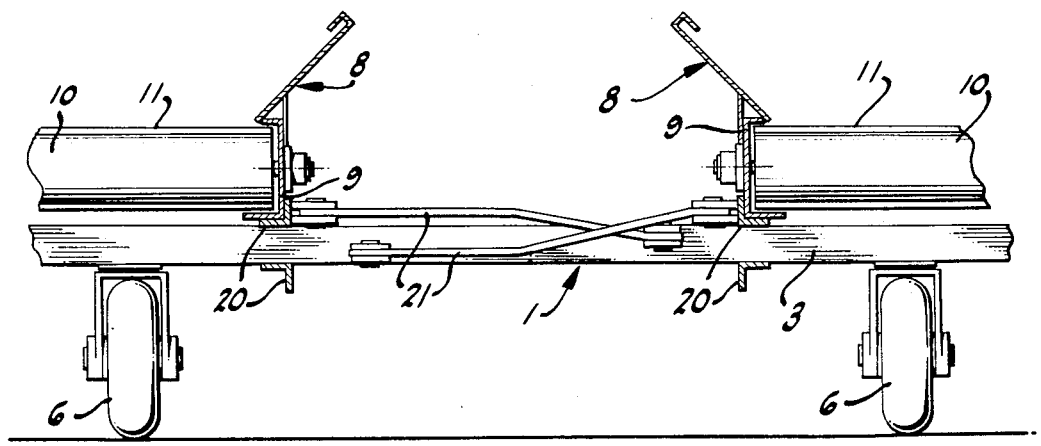
FIG.7

MACHINE FOR COMBINING HAY WINDROWS

BACKGROUND OF THE INVENTION

In the hay growing industry, fresh mowed hay is raked into individual, longitudinally extending, laterally spaced windrows in which the hay remains for a length of time for initial drying. Thereafter, such individual windrows are mechanically raked on the ground laterally toward each other and combined—for further drying and subsequent pickup—in a composite, longitudinally extending, double-size, central windrow.

This practice, however, is subject to objection in that the hay from the individual windrows tends—as raked laterally on the ground—to assume a "wrapped" condition, and further there is a tendency toward excessive shattering.

The present machine was conceived for the purpose of accomplishing the desired result (formation of the composite central windrow) yet with avoidance of the above-described objections.

SUMMARY OF THE INVENTION

The present invention provides, as a major object, a mobile machine which—as it moves along a field between individual, longitudinally extending, laterally spaced, pre-formed windrows—continuously engages and elevates such individual windrows to a predetermined point, conveys such elevated windrows from such point rearwardly out of contact with the ground and in converging relation, and thence deposits said windrows on the ground in a composite, longitudinally extending, double-size, central windrow; all while maintaining such individual windrows in essentially their original form, and without inducing any undesirable wrapping or shattering of the hay.

The present invention provides, as another object, a machine, as in the preceding paragraph, which includes—on a low level mobile frame—a pair of driven, laterally spaced, longitudinally extending conveyors each provided at the front end with a driven pick-up reel operative to engage, elevate, and deliver onto the related conveyor the individual windrows as the machine advances; the conveyors converging rearwardly and moving the elevated individual windrows in such direction, and the rear ends of the conveyors being disposed in relatively closely adjacent relation whereby the individual windrows, as discharged from the rear ends of said conveyors, are deposited on the ground in a composite, longitudinally extending, double-size, central windrow.

The present invention provides, as an additional object, a machine, as in the preceding paragraph, wherein the conveyors are provided at their rear ends with deflectors which cause an inversion of the individual windrows as the latter discharge from the conveyors to form said composite central windrow.

The present invention provides, as a further object, a machine for combining hay windrows which is designed for ease and economy of manufacture, and convenience of use.

The present invention provides, as a still further object, a practical, reliable, and durable machine for combining hay windrows and one which is exceedingly effective for the purpose for which it is designed.

BRIEF DESCRIPTION OF THE DRAWINGS:

FIG. 2 is an enlarged, fragmentary side elevation of the machine; the view showing essentially the forward portion thereof.

FIG. 3 is an enlarged, fragmentary, longitudinal sectional elevation on substantially line 3—3 of FIG. 1.

FIG. 4 is an enlarged, fragmentary side elevation of the machine; the view showing essentially the rearward portion thereof.

FIG. 5 is an enlarged, fragmentary, transverse sectional elevation on substantially line 5—5 of FIG. 1.

FIG. 6 is a cross section on substantially line 6—6 of FIG. 5.

FIG. 7 is an enlarged, fragmentary, transverse sectional elevation substantially on line 7—7 of FIG. 1.

FIG. 8 is a fragmentary plan view showing the driving connections for one conveyor and the related pick-up reel.

FIG. 9 is a schematic plan view showing the flow of the individual, transversely spaced windrows from the ground onto and through the machine, and thence as discharged as a composite central windrow.

FIG. 10 is a cross section of such composite central windrow; the view being substantially on line 10—10 of FIG. 9.

DESCRIPTION OF THE PREFERRED EMBODIMENT

Figure 1:
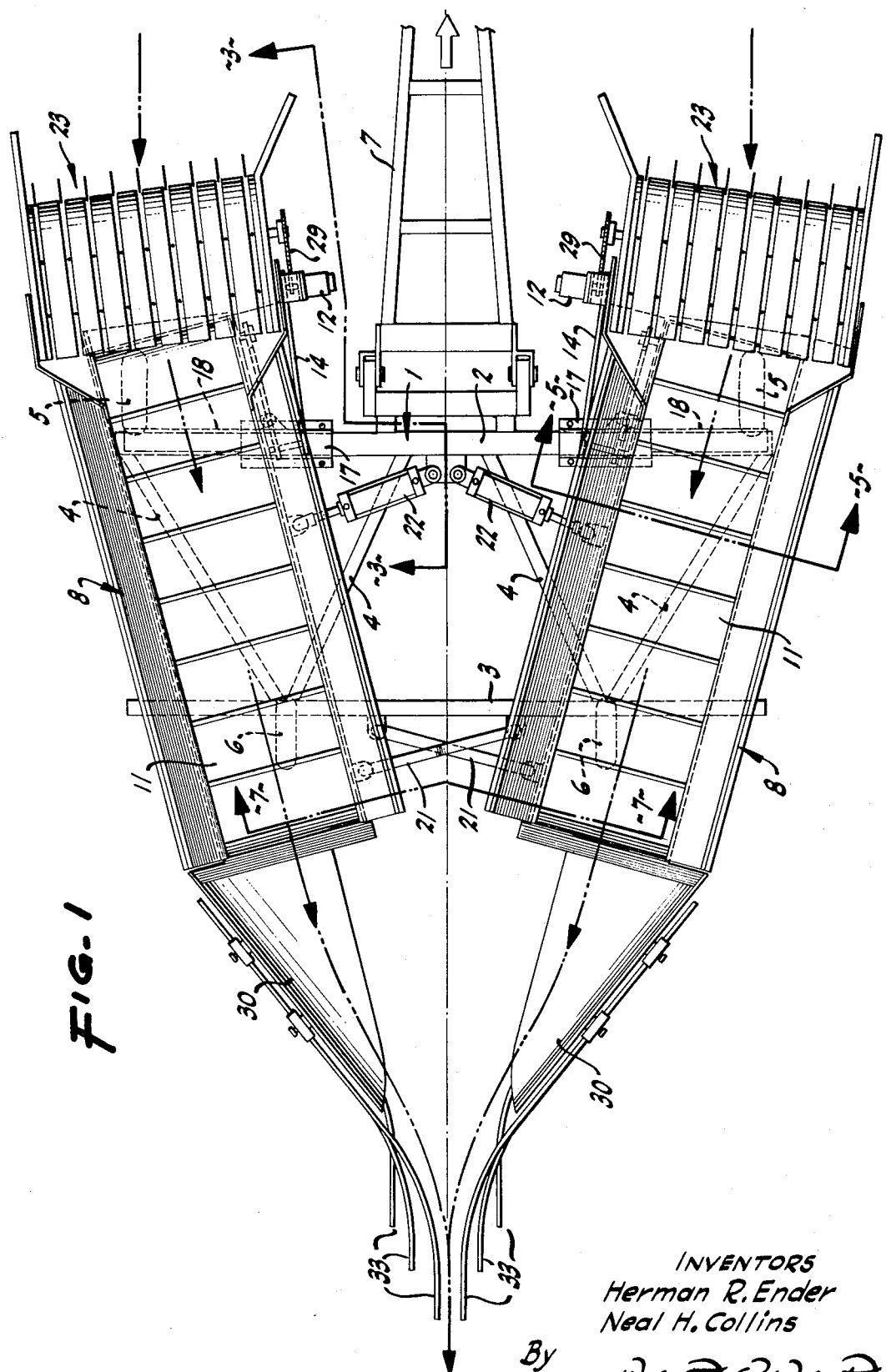
FIG. 1 is a plan view of the present machine.

Referring now more particularly to the drawings and to the characters of reference marked thereon, the machine comprises a rigid, low level, mobile frame, indicated generally at 1, which includes a front cross beam 2 and a rear cross beam 3 connected by braces 4. The frame 1 is supported by transversely spaced, front caster wheels 5 mounted on beam 2, and transversely spaced rear caster wheels 6 mounted on beam 3. A draft tongue 7 is pivoted centrally on and projects forwardly from the front cross beam 2 for hitch-connection to a tractor employed to advance the machine in the field.

A pair of longitudinal conveyors, each indicated generally at 8, is disposed on frame 1 in transversely spaced, rearwardly converging relation; such conveyors being mounted on the frame, in a manner hereinafter described, for adjustment of the angularity thereof relative to the central longitudinal plane of the machine and for the purpose of varying the transverse spacing of the front ends of such conveyors while maintaining their rear ends in adjacent relation.

The conveyors 8, which are of endless belt type, each include a frame 9 and end rollers 10 which carry the endless belt 11 at the turns thereof. The endless belt 11, of each conveyor 8, is driven, with the upper run moving rearwardly, by a hydraulic motor 12 mounted on the inner side of the conveyor 8 at its front end; the drive means—which connects between the motor 12 and the front cross shaft 13 of said conveyor—comprising an endless drive assembly 14, a countershaft 15, and an endless drive assembly 16. See FIGS. 3 and 8.

The mounting means, between the conveyors 8 and the frame 1, includes—for each conveyor—a box sleeve 17 slidably encompassing the front cross beam 2 and fixed on the underside of the conveyor adjacent its front end by attachment to one side of its frame 9. To assure of stability of the conveyor, the box sleeve 17 includes an extension 18 which slidably bears on the front cross beam 2 and projects to a point under the other side of the conveyor frame 9.

Adjacent the rear end thereof, each conveyor 8 is formed on both sides—at the bottom—with rigid guides 19 each having a longitudinally extending slot 20 through which the rear cross beam 3 projects for relative sliding motion both lengthwise and transversely of the machine.

In order to maintain the rear ends of the conveyors 8 in adjacent relation with substantially the same spacing, while at the same time permitting of certain motion thereof attendant adjustment of the transverse spacing of their front ends, a pair of intersecting links 21, formed to clear each other, extend transversely between said rear ends. Each link 21—as shown—is pivoted at one end to a corresponding conveyor frame 9, and at the other and remote end to the rear cross beam 3.

Thus, as the front ends of the conveyors 8 are adjusted to vary the transverse spacing thereof, the box sleeves 17 slide on the front cross beam 2, and the intersecting links 21 permit of accommodating motion of the rear of said conveyors and the attendant limited motion of the rear cross beam 3 in the guides 19.

The conveyors 8 are so adjusted by means of opposed, double-acting, hydraulic power cylinders 22 pivotally connected between adjacent sides of the conveyors and a substantially central point on the front cross beam 2; such power cylinders, which are disposed rearwardly of and diverge slightly relative to the front cross beam 2, normally extending at substantially a right angle to the related conveyor 8. The power cylinders 22, in static condition, hold the conveyors 8 in any position of adjustment on frame 1.

At the front end thereof, each conveyor 8 is fitted with a side-skirted pick-up reel unit, indicated generally at 23; each such unit including a pick-up reel 24—of retracting-tine type—having a shaft 25 journaled in a frame 26 pivoted at 27 on the front end of the frame 9 of the corresponding conveyor 8. As so mounted, each pick-up reel unit floats about the pivot 27; being counterbalanced by a spring device 28 to an extent that said pick-up reel unit bears or rides easily at the sides on the ground.

The pick-up reel units 23 are each driven from the related hydraulic motor 12 by means of an endless drive 29 connected to the shaft 25 of the reel 24. As will hereinafter appear in more detail, the pick-up reel units 23 serve to engage, pick up, and deliver hay windrows to the corresponding conveyors 8.

At the rear end thereof, each conveyor 8 is provided with a longitudinal but rearwardly and inwardly diagonalled deflector 30 which, as shown, curves upwardly from the bottom portion thereof; such deflector being supported by arms 31 upstanding from an extension bar 32 fixed on and projecting back from the frame 9 of the corresponding conveyor 8. As so mounted, the deflectors 30 are disposed in rearwardly converging relation and serve to invert individual hay windrows (discharged from the conveyors 8) and then cause such windrows to deposit on the ground as a composite, double-size, central windrow.

A plurality of relatively long rods 33 are adjustably mounted in connection with the support arms 31 at the back side of the deflectors 30; such rods then curving and extending rearwardly from the deflectors in converging relation and also with a downward sweep. The rods 33 serve to compact the composite, double-size, central windrow as formed.

In operation of the above described machine, the conveyors 8 are first adjusted—by the power cylinders 22—so that the pick-up reel units 23 are spaced apart the same distance as the lateral spacing of the individual, longitudinally extending windrows W preformed in the field. Thereafter, with the machine disposed so that the pick-up reel units 23 are alined with such individual pre-formed windrows W, the machine is advanced by the tractor to which it is connected in draft relation.

As the machine so advances, the pick-up reel units 23 continuously and progressively pick up the corresponding ones of such individual windrows W and deposit them, in continuous streams, on the front of the rearwardly moving belts 11 of the related conveyors 8. The individual windrows W are thus moved rearwardly on the machine, in converging relation, by the conveyors 8; the latter—at their rear ends—continuously discharging such windrows W against the deflectors 30, and the latter act on said discharging windrows to invert the same. Upon the windrows W being so inverted, they then gravitate to the ground and lie one against the other, in somewhat angled relation, in the form of a composite, double-size, central windrow indicated at C.

It will be recognized that the individual windrows W remain intact and are subject to a minimum of shatter as they are picked up, flow rearwardly in converging relation on the machine, and thence discharge from the rear end thereof to form said composite, double-size, central windrow C.

Also, as the individual windrows W are inverted prior to return to the ground, the hay which was first adjacent the ground is generally topside in the composite, central windrow C; this being a feature which assures of more thorough drying of the hay than otherwise possible. The composite, central windrow C remains, of course, in the field for additional drying before being picked up for further handling.

In addition to the inversion of the individual windrows W by the deflectors 30, the rods 33—extending rearwardly from such deflectors—are adjusted so as to bear on and impart desired compaction to the composite, central windrow as it continuously forms on the ground at the rear of and upon advance of the machine.

From the foregoing description, it will be readily seen that there has been produced such a machine for combining hay windrows as substantially fulfills the objects of the invention, as set forth herein.

While this specification sets forth in detail the present and preferred construction of the machine for combining hay windrows, still in practice such deviations from such detail may be resorted to as do not form a departure from the spirit of the invention as defined by the appended claims.

What is claimed is:

1. A machine, for combining hay windrows, comprising a mobile frame adapted for movement along a field between individual, longitudinally extending, laterally spaced, prevformed windrows, a pair of driven, laterally spaced, longitudinal conveyors mounted on the frame, and a rotary, tine-type pick-up reel at the front end of each conveyor, each reel being driven to turn upwardly at the front and disposed and operative to engage, elevate, and deliver the corresponding windrow onto the related conveyor with advance of the machine; the conveyors converging and feeding rearwardly and having their rear ends disposed in such adjacent relation that the individual windrows are discharged from the rear ends of the conveyors onto the ground in a composite, longitudinally extending, double-size, central windrow, the conveyors being frame-mounted for lateral adjustment to vary the angle of rearward convergence thereof, and means connected between the frame and conveyors operative to so adjust said conveyors; the frame-mounting for the conveyors including a forward cross beam on the frame, slides movable on the cross beam, and each conveyor being secured to a corresponding slide.

2. A machine, as in claim 1, in which the frame-mounting for the conveyors additionally includes a rear cross beam on the frame, rear portions of the conveyors slidably resting on corresponding portions of the rear cross beam, and intersecting but independently swingable links disposed adjacent the rear cross beam in a position between the conveyors; one end of each link being pivoted on the rear cross beam, and the other end of such link being pivoted on a related conveyor.

* * * * *